United States Patent [19]

Gifford

[11] Patent Number: 4,486,713
[45] Date of Patent: Dec. 4, 1984

[54] METAL DETECTOR APPARATUS UTILIZING CONTROLLED PHASE RESPONSE TO REJECT GROUND EFFECTS AND TO DISCRIMINATE BETWEEN DIFFERENT TYPES OF METALS

[76] Inventor: Jack D. Gifford, 4943 W. Brown, Glendale, Ariz. 85302

[21] Appl. No.: 306,301

[22] Filed: Sep. 28, 1981

[51] Int. Cl.³ .................. G01V 3/10; G01R 33/02
[52] U.S. Cl. ............................. 324/329; 324/233; 324/239
[58] Field of Search ........... 324/329, 326, 327, 334, 324/339, 330, 233-236, 239

[56] References Cited

U.S. PATENT DOCUMENTS

| | | | |
|---|---|---|---|
| 4,024,468 | 5/1977 | Hirschi | 324/329 |
| 4,030,026 | 6/1977 | Payne | 324/329 |
| 4,110,679 | 8/1978 | Payne | 324/329 |
| 4,128,803 | 12/1978 | Payne | 324/329 |
| 4,325,027 | 4/1982 | Dykstro et al. | 324/329 |

FOREIGN PATENT DOCUMENTS 2041532  9/1980  United Kingdom ............... 324/329

OTHER PUBLICATIONS

LeGaye, E. S., "Induction Balance Detector," *Electronic Metal Detector Handbook*, Western Heritage Press, Mar. 1975, pp.95-99.

*Primary Examiner*—Gerard R. Strecker
*Assistant Examiner*—Warren S. Edmonds
*Attorney, Agent, or Firm*—H. Gordon Shields

[57] ABSTRACT

Metal detector apparatus includes a controlled phase responsiveness to allow operation with reduced ground effects while discriminating between different types of metals. A phase relationship is predetermined that will reject unwanted signals from mineralized ground and trash metals and will be responsive to the signals from desired metals. The algebraic relationship between two signals is determined so that only input signals falling within the desired algebraic relationship are used to provide an output signal.

8 Claims, 7 Drawing Figures

METAL DETECTOR APPARATUS UTILIZING CONTROLLED PHASE RESPONSE TO REJECT GROUND EFFECTS AND TO DISCRIMINATE BETWEEN DIFFERENT TYPES OF METALS

BACKGROUND OF THE INVENTION

1. Field of the Invention

This invention relates to metal detectors, and, more particularly, to metal detectors having the capability of reducing ground effects while discriminating between different types of metallic objects.

2. Description of the Prior Art

U.S. Pat. No. 4,128,803 uses a metal detector which has a transmit coil inductively coupled to a receiving coil and an oscillator connected to the transmit coil. The signals detected by the receive coil are processed by three synchronous demodulators, the first and second synchronous demodulators are used for detecting "R" or eddy current signal components and "X" or reactive signal components, respectively, and which two signal components are then used as inputs to the third synchronous demodulator. The output from the third synchronous demodulator is representative of the presence of a metallic object, and the polarity of the output signal indicates the particular type of the metallic object detected.

U.S. Pat. No. 4,024,468 discriminates between different types of metallic objects by amplitude discrimination. The amplitude of the received signal is representative of the type of metallic object detected. A tuning control is used to adjust the amplitude of a signal received from mineral soil to substantially eliminate the effects of ferrous mineral soils.

U.S. Pat. No. 4,030,026 discloses metal detector apparatus which uses a sampling technique in which the received signal is sampled and the sample voltage is utilized to produce an output signal corresponding to a selected component of the received signal. Since the output is based on a predetermined component of the received signal, the reactive components in the received signal due to mineral soils or other background conditions are simply ignored.

The dominant type of metal detector in contemporary use is a transmit-receive detector operating in the very low frequency portion of the radio frequency spectrum. This type of detector is usually referred to as a VLF/TR detector. The detectors are generally operated by moving a search head over the ground to be searched. The search head usually contains at least a single conductive coil which is coupled to an oscillator A magnetic field is generated by the transmit coil, and the generated field provides a sinusoidal wave corresponding to the frequency of the oscillator. Any metallic object passing into the magnetic field causes a reaction. The reaction, as received by a receive coil in the metal detector head, is ultimately presented to the user of the apparatus by some type of indicating element, or elements, such as a meter, an audible signal, etc.

In addition to discrete metal elements in the soil, which cause reactions from a metal detector, mineralization in the ground, usually ferrous oxides, also causes a reaction by metal detector apparatus, and the reaction is different from the reaction caused by conductive metals. Early metal detectors generally had two operating modes, a first mode for detecting conductive metals, and a second mode for detecting mineralized ground.

There is about a ninety degree difference between signals caused by soil mineralization and signals caused by conductive metals. By sampling the received signals ninety degrees out of phase with the oscillator allows minerals to be detected. A peak mineral signal usually occurs where the oscillator is crossing zero, which is a phase shift of about ninety degrees. This will be discussed in detail below, in conjunction with FIG. 1. For purposes of the present apparatus, and as is usual in the art, the sampling of the mineral signal at the time the oscillator output is zero, which is the time of maximum amplitude of the mineral soil signal, will be referred to as the mineral sample phase. This is generally referred to as the "reactive" or "X" component of the received signal.

Figure 1:
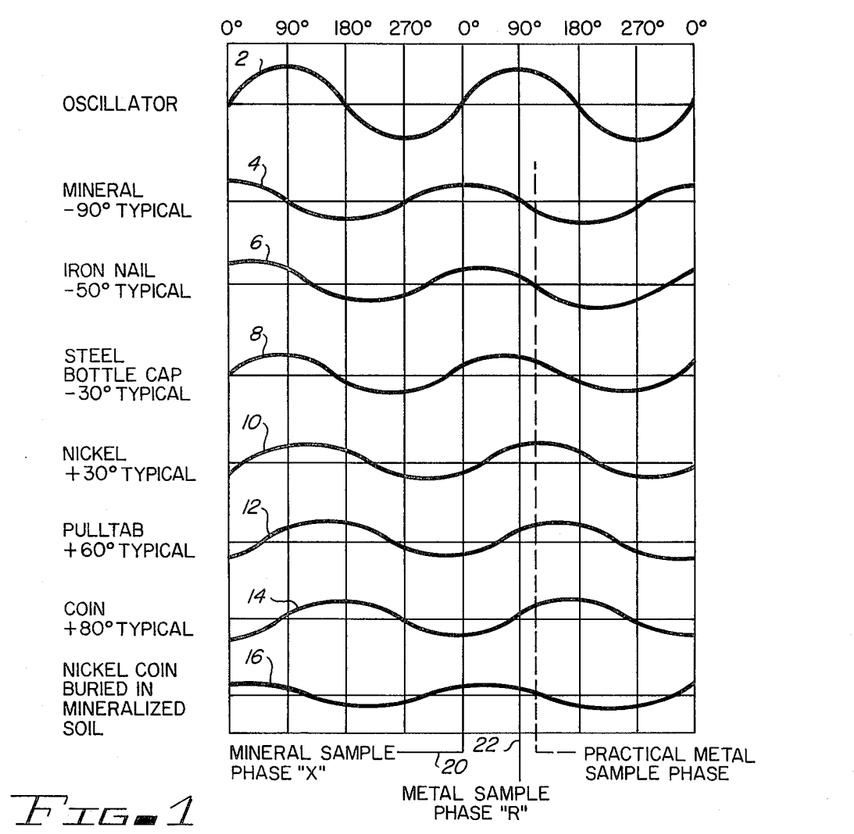
FIG. 1 is a wave form drawing illustrating the relationship between an output wave form and input wave forms for a plurality of objects.

The sampling of the received signal ninety degrees later, when the amplitude of the mineral signal is zero, is referred to as the metal sample phase, or the "resistive", "eddy current" or "R" component of the received signal. As a practical matter, the metal sample phase is usually sampled slightly more than ninety degrees after the mineral sample phase. However, for purposes of the present application, and as disclosed in the drawings to be discussed hereafter, the mineral sample phase and the metal sample phase or the "X" and "R" components of the received signal will be considered as ninety degrees apart. The practical metal sample phase, sampling as shown in FIG. 1, provides a stronger positive response to objects, such as coins, which are of prime concern to metal detector users. However, this also provides a stronger negative response for mineral signals, which is undesirable, than if the metal sample phase is sampled ninety degrees after the mineral sample phase, which is the time of the zero mineral signal.

The mass and surface area of a metal element affects the signal or the signature of the metal as detected with the metal detector. Once mineral soil is detected, the various signatures of the metals are relative to each other and generally fall out in the order given herein, as discussed below. The characteristics of the oscillator, input circuitry, and coil configuration used by a particular metal detector with respect to mineral soil is of primary importance and accordingly must first be determined. After the mineral soil is determined with respect to its signature and with respect to a particular metal detector, the other elements, such as discussed below, are generally fixed in order. For purposes of the present application, various elements are illustrated and are discussed, and their respective signatures are illustrated in wave forms and in vector diagrams. The order in which objects appear in phase with respect to each other is due to their metallic content and to the makeup of the objects and will generally be the same in all transmit/receive metal detectors.

Since the early detectors used a practical metal sample phase that allowed a large negative mineral response, the detectors were difficult to use over mineralized ground. When used in the metal mode, they tended to find all matter of metallic junk elements, such as nails, tinfoil, hair pins, bottle caps, etc. These two drawbacks were first solved on an individual basis.

The manufacturers of metal detectors discovered that by rotating the sample axis they could not only select whether the detector would respond to mineral or metal, but they could also discriminate between various commonly found metallic objects. According to the rotation of the sampling axis, various metallic elements may have either a positive component or a negative component.

By configuring the detectors' electronic circuitry to respond with an audio output or a meter indication for positive "R" axis signals, and no output or indication for negative "R" axis signals, a metal detector can be made to be nonresponsive to much of the unwanted and worthless metallic trash commonly found where people have congregated.

The techniques of discrimination discussed above are well known and are practiced by virtually all metal detectors in various configurations.

The type of signal demodulators used in metal detectors may be either synchronous or asynchronous, since the received signal in a transmit/receive detector is generated by the oscillator and modified in phase by the detected object. The receive signal is accordingly synchronized to the oscillator.

The '468 patent discussed above is typical of the type using an asynchronous demodulator. The demodulator used is a peak detector which responds positively to the decrease in amplitude of the received signals. The operating phase of the peak detector is established by biasing the receive coil signal with a phase shifted signal from the oscillator. The phase of the residual signal is set such that the addition of signals from desired objects causes a decrease in amplitude, and signals from unwanted objects cause an increase in amplitude.

Most metal detector apparatus in contemporary use have synchronous demodulators to provide the ability to discriminate. A phase variable signal is generated from the oscillated signal, and the phase variable signal is used as a reference signal for the synchronous demodulator. Varying the phase of the reference signal changes the sampling axis to provide the ability to discriminate, as discussed above, and as will be discussed in detail below.

The '026 patent discussed above is typical of current detectors using synchronous demodulators. The '026 apparatus covers the sampling of the received signal where the mineral signal is crossing zero, which is discussed above, and which is shown in FIG. 1 as the metal sample phase. This sampling point is indicated by the "R" vertical line in FIG. 1 and by the "R" axis in FIG. 2.

Sampling where the mineral components is zero frees the detector from adverse detuning effects of mineralized ground. By rotating the sampling axis, a metal detector may also be made to discriminate between various metal objects, as discussed more in detail herein. The '026 apparatus samples the received wave form at the mineral sampling zero crossover which frees the apparatus of mineral effects, but the apparatus is incapable of discriminating at that time.

The sampling axis, or "R" axis, is taken ninety degrees out of phase with the mineral signal, or "X" axis. Thus, the mineral signals will have no effect on the "R" sampling axis, but all of the metallic objects which are of common interest will have a positive component along the "R" sampling axis, as shown in FIG. 1.

By rotating the sampling axis more than 90° with respect to the "X" axis, discrimination between the various metallic objects can be accomplished. However, the mineral component signal will have a negative component on the rotated sampling axis. Therefore, rotating the sampling axis could either provide mineral-free detection or discrimination between various metallic objects, but not simultaneously.

The general concept of the mineral-free sampling has been known for many years. It was first developed for early military mine detectors. Those early mine detectors used a pair of synchronous demodulators to detect the "X" and "R" components. However, the technique of using the two synchronous demodulators and other prior art techniques, were not able to provide mineral-free operation while discriminating between various types of metals. In the prior art, several methods have been devised to provide such discrimination and mineral-free operation, but they have not been without undesirable effects.

Since the received signal is a composite of a response of the magnetic field to all objects that have an effect on the receive coil, a readily apparent way to differentiate the various components of the composite wave form is based on the motion of the search coil over the ground. If the search coil were to be swept back and forth at a constant height above the ground, the tuning could be adjusted to cancel the mineral component of the wave form and to reestablish the operating point of the detector to correspond to the origin of vector diagrams such as included in FIGS. 2-6 herein. However, most operators tend to swing the search coil with a pendulum effect, since the pivot point of the detector is the operator's hand which is several feet above the ground. The pendulum effect means that there is a slow, rhythmic mineral signal that increases in amplitude as the coil is raised at each end of the swing. If the contour of the ground changes, there will be faster mineral changes with respect to the amplitude of the signal. However, this effect is relatively slow.

As the search coil passes over a metal object, such as a coin, the response is very rapid due to the brief time duration that the search coil is disposed over the metal object. Most attempts to provide mineral-free operation and to simultaneously discriminate have used this frequency domain difference to provide the desired results.

One way to solve the discrimination problem and mineral-free operation at the same time is by way of feedback circuitry incorporating time delays in the feedback loops. The feedback response is intended to be fast enough to cancel the slow mineral signal, and yet at the same time be slow enough to react to the higher frequency components of the metallic target response. However, this technique has an undesirable effect in that to be of substantive value in helping tune out the mineral effects, the feedback must be reasonably fast. When a metallic target is passed over, the feedback compensates for large portions of the metallic target response, which weakens the response to the object itself. At the same time, when the search coil passes over an object, the opposing feedback signal tends to bias the receive coil in the opposite polarity until the time delay allows the demodulator to sense the result and to remove the opposing feedback signal.

To illustrate the statements contained in the preceding paragraph, an example may be appropriate. As a detector coil is passed over a nail buried in mineral soil, a wave form without feedback would indicate a negative response, assuming the "R" sample axis is set at about 225°, which would theoretically eliminate or discriminate between a coin and unwanted or undesirable metallic trash objects. With a delayed feedback, the effect of the nail is substantially cancelled, but then a signal is generated which corresponds to a 180° phase reversal as the nail effect is lost but the feedback effect is still present. Thus, the opposing wave form generated due to the feedback effect indicates that the nail is actually a good or desirable object.

The feedback concept still results in problems which are undesirable. Other attempts have been made to solve the undesirable problems, such as a.c. couplings or low pass filtering. These also have resulted in the same undesirable effects.

In the '803 patent, briefly discussed above, a detector is described which overcomes the undesirable effects by using three synchronous demodulators and matched band pass filters. Two of the synchronous demodulators are used to detect the components of the composite signal where the mineral signal is zero and at some desired discriminate setting. The mineral-free demodulator is referred to as the "R" demodulator, and the discriminating demodulator is referred to as the "X" demodulator. The sample axis of the "X" demodulator may be rotated to provide the desired degree of discrimination, as discussed above.

In the '803 patent, the outputs of both the "X" and "R" demodulators are passed through band pass filters which remove any low frequency signal components and provide what is referred to as "ringing" signal outputs at a frequency of about twenty Hz. These signals both exhibit the previously discussed effects of having a large 180° flyback signal as the result of their having lost their d.c. reference component in the filters. The purpose of the third synchronous demodulator is to provide d.c. restoration to the "X" signal, which substantially eliminates this undesirable effect. The "R" signal is used as a reference to demodulate the "X" signal. The inputs to the third synchronous demodulator are the two filtered "X" and "R" signals.

Since both filter signals are generated by the same metallic object, the "R" signal prior to filtering will be a positive pulse, and the "X" signal, prior to filtering, will be positive for a desired object and negative for an undesired object. Accordingly, the ringing signal outputs of the filters will be in phase if the pulses are both positive, or out of phase if the "X" signal is negative.

The third synchronous demodulator looks for positive "X" signals when "R" is positive. It also looks for negative "X" signals when the "R" signal is negative. When the "R" signal changes polarity due to the ringing of the filtered signals, the third synchronous demodulator has the effect of reversing the X demodulator sample axis. Depending on the polarity of the R signal, undesirable objects will provide one type of output signal, and desirable objects will provide a different type of signal.

The approach of the '803 patent, while providing a solution of the undesirable effects of a.c. coupling or filtering, also has some inherent undesirable effects. For example, the filters used must be very well matched in response since the elimination of the mineral ground effects is accomplished entirely by the filters and since the third synchronous demodulator is phase sensitive. Moreover, any phase delay or difference between the two ringing signals of ninety degrees or more over the duration of the ringing signals may be interpreted by the third synchronous demodulator as a 180° phase reversal of one of the signals. This would appear as the same effect as a delayed feedback discussed above, and an undesirable object would accordingly cause both a negative response and a positive response when the phase difference exceeds ninety degrees.

Another problem with the apparatus of the '803 patent is cost. The matching of components, including the filters, resistors, and capacitors is relatively expensive, and the labor required to match the components is also relatively expensive.

The apparatus of the present invention overcomes the problems of the prior art, as discussed above, without requiring a third synchronous demodulator and the matched components needed in the '803 patent and overcomes the problems of the prior art as discussed in general above.

SUMMARY OF THE INVENTION

The invention described and claimed herein comprises metal detector apparatus with complementary phase response having a pair of demodulators into which input signals are received representing two sample axes and the output of which is considered in absolute terms. By rotating the sampling axes, and by predetermining the limits in absolute terms of the outputs from the two demodulators, ground response may be minimized and outputs representative of predetermined types of metals may be selectively identified.

Among the objects of the present invention are the following:

To provide new and useful metal detector apparatus;

To provide new and useful metal detecting apparatus which may substantially eliminate mineralized ground defects;

To provide new and useful metal detector apparatus which discriminates among various types of metals;

To provide new and useful metal detecting apparatus responsive to the phase shift of an output signal in response to the type of metal detected by the output signal;

To provide new and useful metal detection apparatus operating in a very low frequency portion of the radio frequency spectrum;

To provide new and useful metal detection apparatus having selectively variable phase angles for an output signal and for selectively determining the phase responsiveness to an input signal; and To provide new and useful apparatus for detecting preselected types of metals.

DESCRIPTION OF THE PREFERRED EMBODIMENT

FIG. 1 is a waveform drawing showing the relationship of various waveforms involved with metal detectors, in general, and illustrating the shifting of the phase angle from the output waveform transmitted from the detector apparatus by various types of metal and by the soil. An oscillator waveform 2 comprises the output signal transmitted by the metal detector transmit coil, which is typically in the head of the detector apparatus. Waveform 2 is a sinusoidal wave showing two complete cycles of the wave, for a total of seven hundred twenty degrees. The oscillator wave 2 begins at zero degrees, rises to maximum amplitude at 90°, returns through zero at 180°, reaches a minimum amplitude at 270°, and passes through zero 360° after the beginning, and which is noted in FIG. 1 as zero degrees, again for a complete cycle. The waveform for an additional 360°, or a second cycle, is shown in FIG. 1 as a continuation or a repetition of the 90°, 180°, 270°, and zero degrees, again. It is a repeat of the first 360° portion of the waveform. Sine waveforms are well known and understood.

Waveforms 4, 6, 8, 10, 12, and 14 show the relationship of waveforms received by bringing a search coil of a detector into proximity with various metallic objects. Waveform 16 comprises a composite waveform of a nickel coin buried in mineralized soil.

The waveforms 4–16 are all shown in relation to the oscillator output waveform 2. Waveform 4 is an illustration of a reflected wave from mineral soil, typically soil having iron oxides therein, and illustrating a 90° shift from the oscillator or output waveform 2. That is, the reflected waveform from mineral soil shifts 90° from the oscillator output waveform 2. The mineral waveform 4 leads the oscillator output waveform 2 by 90°. The waveform 4 crosses through zero at 90°, reaches its minimum or minus amplitude at 180°, passes upwardly through zero at 270°, and reaches its maximum amplitude again at zero degrees.

Waveform 6 illustrates a waveform reflected by an iron nail, which is leading the oscillator waveform 2 by about fifty degrees. That is, the maximum, zero, and minimum amplitudes lead by about fifty degrees the oscillator waveform 2.

Waveform 8 represents a typical waveform for a steel bottle cap. It leads the oscillator waveform by about thirty degrees.

Waveform 10 illustrates the waveform responsive to nickel. It lags the oscillator output waveform 2 by about thirty degrees. That is, its maximum, zero, and minimum amplitude lag the oscillator waveform 2 by about thirty degrees.

Waveform 12 illustrates a waveform for aluminum, such as an aluminum pull tab. The waveform 10 lags the oscillator waveform 2 by about sixty degrees.

Waveform 14 represents a typical waveform for a coin, which lags the oscillator output waveform 2 by about eighty degrees. The coin for which the waveform 12 is responsive may be silver, or a combination of silver and some other metal, or copper, such as a dime, a penny, a quarter, etc.

Waveform 16 represents the waveform for a nickel coin buried in mineralized soil. It appears very similar to that of the iron nail, but with less amplitude.

The waveforms illustrated in FIG. 1 are illustrative, and indicate that each type of metal, including mineral soil having iron oxide therein, has a distinctive waveform when compared to the output or oscillator waveform 2. It will be noted that the waveforms 4, 6, 8, 10, 12, 14, and 16 are sine waves, like the oscillator waveform 2. However, the amplitude of each of the waveforms 4–16 is less than the waveform 2 from the oscillator.

The waveforms 4 ... 16 are not necessarily indicative of actual waveforms, since actual waveforms will differ with virtually each instrument. The waveforms 4 ... 16 are accordingly exemplary only. However, once a mineral signal or waveform is found, the other signals are relative and they fall into place generally as shown in the waveforms 4 ... 16.

For metals, either pure or composite metals, the waveforms may vary in phase from that illustrated in FIG. 1. Moreover, for metals of various types buried in mineral soil, the waveforms may also differ in phase from that illustrated. For example, the waveform 16 differs from waveform 10 in both phase and amplitude. However, for purposes of illustrating the apparatus of the present invention, and the philosophy associated therewith, the waveforms illustrated in FIG. 1 will be used herein.

The waveforms of FIG. 1 are illustrated in vector diagrams in FIGS. 2, 3, 4, 5, and 6. The vector diagrams of FIGS. 2–6 simplify the illustration and explanation of the apparatus of the present invention with respect to identifying specific metals while rejecting other metals, and illustrate the rejection of the mineralized soil in detecting metal objects.

As is well known and understood, a metal detector generally uses a search head which is moved over the ground to be searched. The search head usually contains one or more inductive coils which are part of an oscillator tank circuit. The oscillator tank circuit is typically driven by an oscillator having a sinusoidal output, such as the waveform 2 in FIG. 1. The coils in the search head serve as a transmitter and a receiver antenna. A magnetic field is generated by the transmitter coil, and any metallic object passing into the magnetic field causes some type of measurable reaction. The reaction may be measured as a frequency shift, an amplitude change, an inductive change, or a combination of effects. In FIG. 1, and in FIGS. 2–6, the effect is illustrated as a change in both phase and amplitude.

By sampling the received signal, or signals, at predetermined time periods with respect to the oscillator signal, two components may be detected and plotted, as on the vector diagrams of FIGS. 2–6. The sampling of the signal is illustrated in FIG. 1 by the vertical lines representing "X" sample phase and "R" sample phase. The mineral sample phase is commonly referred to as the "reactive" or "X component" of the received signal. In the vector diagram of FIG. 2, the two sample phases, which are ninety degrees apart, are simply identified as the X axis and the R axis, which axes have been discussed above in detail in conjunction with the Description of the Prior Art. However, in FIGS. 4, 5, and 6, the sampling axes are simply identified as sampling axis A and sampling axis B, since it is not necessary to refer to them by R and X designations. The R and X designations are not pertinent or relevant to the present invention, as will be discussed in detail.

As has been previously indicated, once mineral soil is detected, the signatures of the various metals are relative and they generally fall out in the order shown in FIG. 1, Accordingly, the first determination that must be made is to determine the relationship of the oscillator of a given metal detector with respect to mineral soil. Assuming the relationship, for purposes of the present invention, of mineral soil and of the various elements as indicated in FIG. 1, the vector diagram of FIG. 2 may then be made.

Figure 2:
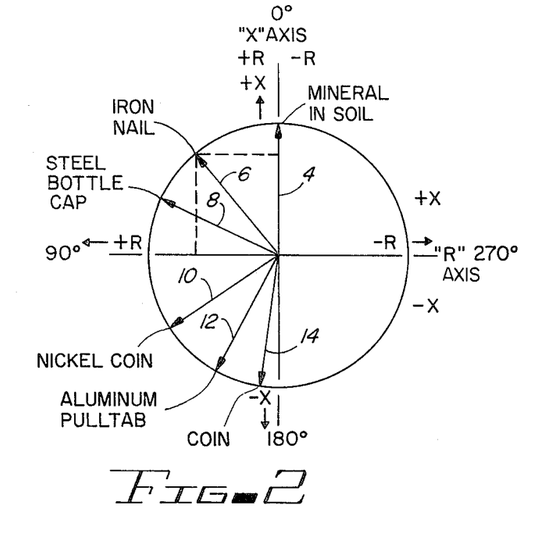
FIG. 2 is a vector diagram illustrating a portion of the wave forms of FIG. 1.

In FIG. 2, a vector diagram is made with the X sample phase, or X axis, taken along the vector for the mineral soil, which corresponds to the mineral sample phase of FIG. 1. At the mineral sample phase, the oscillator waveform is passing through zero degrees in a positive direction. This is at a maximum amplitude for mineral soil. The metal sample phase, or R axis, is taken ninety degrees later. At the metal sample phase, or along the R axis, the mineral soil waveform passes through zero, and the mineral soil accordingly has no R axis component.

In FIG. 2, the first six object signals from FIG. 1, namely the objects or elements for which waveforms 4, 6, 8, 10, 12, and 14 are shown in FIG. 1, are plotted as vectors relative to the oscillator phase. The phase angles of the vectors are representative of the angle of the peak positive response of the object or element, and the vector lengths are indicative of the relative amplitude of the received signal. The vectors are identified with the reference numerals associated with the waveforms of FIG. 1, and designate the element (mineral) or metal object associated therewith, as identified in FIG. 1.

The X and R axes provide a relatively simple rectangular coordinate system in which the amplitude of an object at various phases may be predicted. For example, projecting the terminal point of the iron nail vector 6 from FIG. 2 onto the X and R axes, respectively, shows that the response to an iron nail will be about eighty percent as strong in the R direction as in the X direction. This is indicated by a dotted line in FIG. 2 extending from the head of the iron nail vector, which is on the circle, extending horizontally to the X axis, and another dotted line extending from the vector head on the circle downwardly to the R axis. The conclusion with respect to the eighty percent strength in the R direction as in the X direction may be confirmed by referring to FIG. 1. The positive iron nail response, or amplitude, for waveform 6, at the R sample point, which is ninety degrees with respect to the oscillator waveform 2, is less than its value (amplitude) at the X sample phase, which is zero degrees for the oscillator. The R axis amplitude appears to be about eighty percent of the X axis amplitude.

Comparing the vectors of FIG. 2 with the waveforms of FIG. 1, one readily observes that the vectors 6 and 8 are positive in both the mineral sample phase (X) and the metal sample phase (R), while vector 4 is positive at the X sample phase and zero at the R sample phase. The vectors 10, 12, and 14 are positive at the metal sample phase (R) and negative at the mineral sample phase (X). The positive and negative components are correlated with respect to the positive and negative (plus and minus) components of the two axes, namely the plus and minus R axis and the plus and minus X axis, in the vector diagram of FIG. 2.

Figure 3:
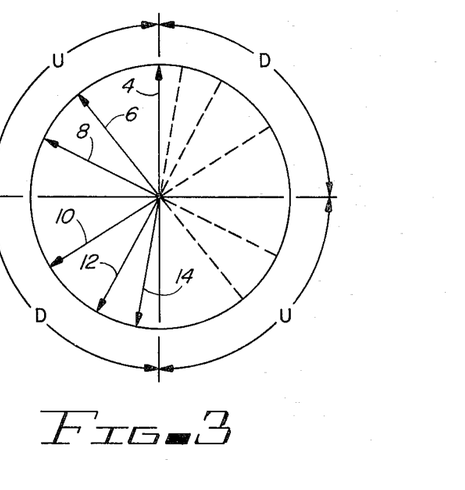
FIG. 3 is a vector diagram showing a desired phase response to reject predetermined metallic elements and other undesirable effects.

FIG. 3 is a vector diagram illustrating a desirable response for a discriminator which eliminates the undesirable effect of "flyback" due to A.C. coupling, delayed feedback, or filtering, and which response is used by the apparatus of the present invention. The vector diagram includes equal and opposite portions of the response spectrum for both desirable objects and undesirable objects, and includes the "flyback" signal for both desirable and undesirable objects. The "flyback" signal is illustrated in FIG. 3 by dotted lines extending in the opposite direction from the vectors 6, 8, 10, 12, and 14. The equal and opposite desirable and undesirable portions of the vector diagram of FIG. 3 comprise separate ninety degree portions of the vector diagram. They are designated in FIG. 3 by extensions of the respective X and R axes from FIG. 2, but in FIG. 3 they are not designated as X and R axes. Rather, the extensions of the axes, which are at the three o'clock, six o'clock, nine o'clock, and twelve o'clock positions in FIG. 3, are simply indicated by the letters "D" for desirable and "U" for undesirable. Thus, regardless of the polarity of the desirable or the undesirable response, any signal which falls in the portion of the spectrum indicated by "D" indicates a desirable object, and any signal which occurs in an undesirable or "U" portion of the spectrum indicates an undesirable object. The sampling method provides that both the primary response and the "flyback" response for a desirable object are good signals, by definition. Similarly, by definition, both the primary response and the "flyback" response from undesirable objects are undesirable signals which may be disregarded.

Figure 4:
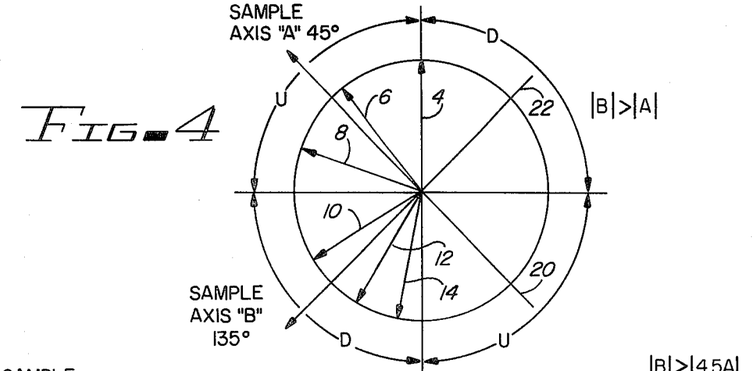
FIG. 4 is a vector diagram illustrating the accomplishment of the desired response illustrated in FIG. 3.
Figure 5:
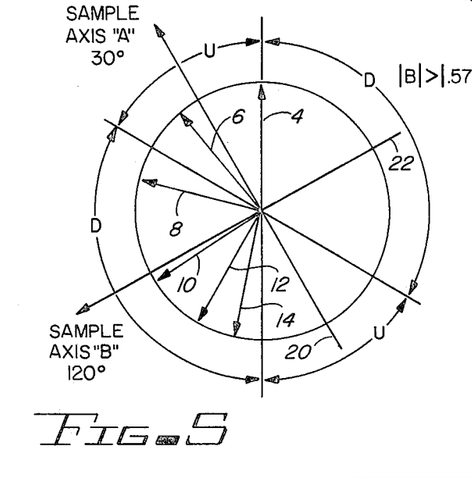
FIG. 5 is a vector diagram illustrating the broadening of the desired phase response of FIG. 4.
Figure 6:
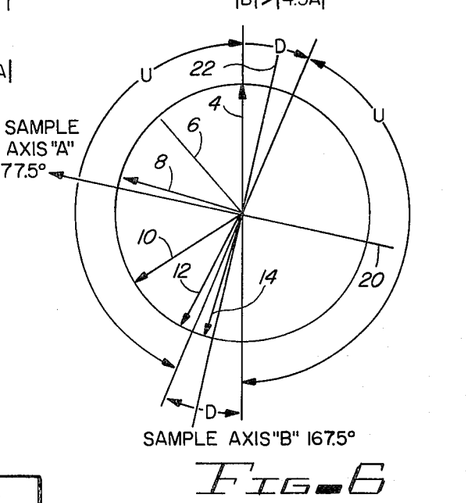
FIG. 6 is a vector diagram illustrating the narrowing of a desired phase response of FIG. 4.

A desired response may be achieved by rotating the sampling axes normally associated with the mineral sampling, or "X" axis, and the metal sampling, or "R" axis, so that their axes are at 45° and 135°, respectively, with respect to the peak or no response factor. This is shown in FIG. 4. The sampling axes are, at these sampling points, no longer primarily responsive to one type of signal, but their response is a combination of mineral and metal signals. Since they no longer primarily define a specific type of response, the definitions of a reactive "X" and eddy current "R" components are no longer meaningful. Accordingly, the sampling axes may be referred to simply as axis A and axis B, as shown in FIGS. 4, 5, and 6.

FIG. 4 illustrates a sampling method which accomplishes the desired response discussed above in conjunction with FIG. 3. The Figure includes a pair of sample axes, designated sample axis A and sample axis B, which are disposed at 45° and 135°, respectively, to the peak mineral response vector 4. In FIG. 4, sample axis A is identified by reference numeral 20, and sample axis B is designated by reference numeral 22. The sample axes are ninety degrees from each other. The desirable portion of the spectrum, designated by letter D, is disposed within forty-five degrees on either side of sample axis B. The desirable portions of the spectrum are defined by the algebraic relationship provided or defined by the equation B is greater than A, when only the absolute values of B and A are considered.

By configuring a comparator/amplifier circuit to yield an output of one polarity when the absolute value of B is greater than the absolute value of A, and to yield an output of the opposite polarity when the absolute value of B is less than the absolute value of A, a practical detector may be made which would negate the undesirable effects discussed previously. Objects which provide a response such that the absolute value of B equals the absolute value of A would provide a zero output from the comparator/amplifier.

The desired response is achieved by a comparison of absolute values, and the voltage polarities of the sampling A and B axes are accordingly unimportant.

Since a user of a metal detector may want to include different types of metallic objects as desirable, the areas of desirable response, such as shown in FIGS. 3 and 4, should be variable by the user. Such may be accomplished by the apparatus of the present invention by scaling the response of one or both of the A and B axes demodulators, or by varying the inputs of the comparator/amplifier. This serves to narrow or widen the desired response area centered on one of the sample axes, and is illustrated in FIGS. 5 and 6.

The sample axes may be rotated to cover the desired response portion of the phase spectrum, as shown in FIGS. 5 and 6. In FIG. 5, the sampling axes, or A and B axes, are rotated to thirty degrees and 120°, respectively, with respect to the maximum mineral soil signal, and the scale is changed such that the comparator/amplifier provides a desired output response when the absolute value of B is greater than the absolute value of 0.57A. Thus, the "D" portion of the spectrum in the vector diaphragm of FIG. 5 is widened to an amount which is substantially greater then 90°. This results in the metal detector providing a desirable response for all of the objects shown except the iron nail. That is, the iron nail alone is excluded as providing an undesirable response. The other elements, the bottle cap 8, the nickel 10, the pull tab 12, and the coin 14, all result in a signal response which is defined as being a desirable output.

In FIG. 6, the A and B axes are rotated to 77.5° and 167.5°, respectively, from the maximum mineral signal, and the scale is changed to obtain a desired output when the absolute value of B is greater than 4.5 times the absolute value of A. This provides means for obtaining a desirable response for only the coin among the objects shown. The desirable portion of the output spectrum is thus substantially narrowed to eliminate all responses except the response from the coin. Or, in other words, the response from the coin alone falls in the desirable range, and the response from all other items falls within the undesirable response.

It will be noted that the flyback signals, illustrated by dotted lines extending 180° from the primary vector in FIG. 3, have not been included in FIGS. 4–6. However, since only absolute values are considered in the apparatus of the present invention, such flyback signals are considered in the present apparatus as good signals. They are desirable signals if they fall within a stated or defined equation, and they are undesirable signals if they fall without such equation, as illustrated in FIGS. 4, 5, and 6 by the respective "D" and "U" portions of the spectra.

Figure 7:
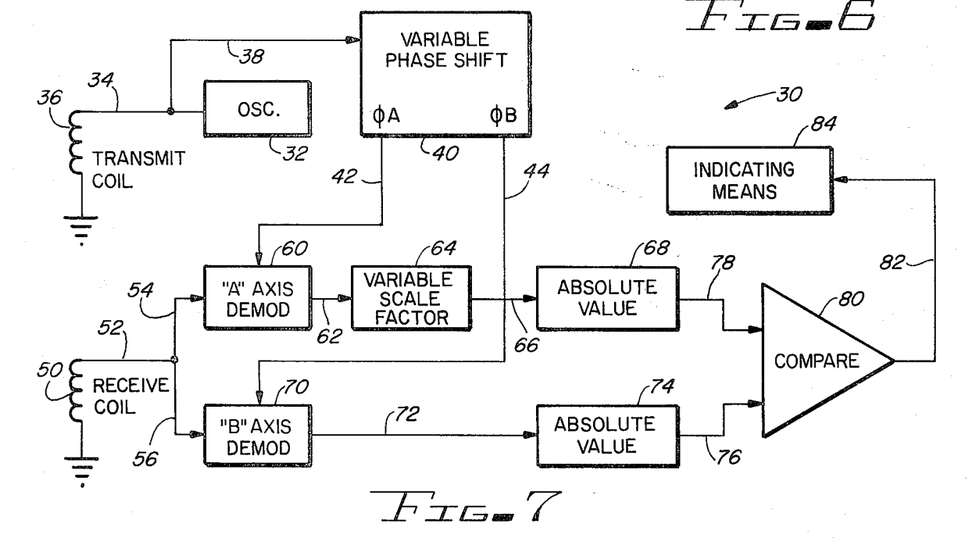
FIG. 7 is a block diagram schematically illustrating the preferred embodiment of the present invention.

FIG. 7 is a block diagram of apparatus 30 of the present invention. The apparatus 30 includes an oscillator 32 which provides a sine wave signal on conductor 34 to a transmit coil 36. The oscillator 32 is preferably similar to that which has been discussed above, which includes a transmit coil as part of its resonant circuit. The oscillator also preferably operates in the very low frequency portion of the radio frequency spectrum, between about three KHZ and about thirty KHZ.

A conductor 38 is connected to conductor 34 and transmits part of the oscillator output to a variable phase shift 40. The phase shift circuitry 40, well known and understood in the art, provides reference signals to a pair of demodulators, namely an A-axis demodulator 60 and a B-axis demodulator 70 through a pair of conductors 42 and 44, respectively. The A-axis and B-axis demodulators 60 and 70 are ninety degrees out of phase with each other, and they maintain this phase difference as the sample axes are varied or rotated.

Input to the A-axis demodulator 60 and to the B-axis demodulator 70 is from a receive coil 50. The receive or search coil 50 may be of any contemporary design, generally well known and understood in the art. As has been discussed above, various types of coils may provide different basic phase responses to various metallic objects, as referenced to a particular oscillator. Such effects are well known and understood, and only require an adjustment to the phase shift circuitry 40 in the implementation of the present invention.

A conductor 52 extends from the search or receive coil 50 to a pair of conductors 54 and 56. The conductors 54 and 56 extend from conductor 52 to the A-axis demodulator 60 and the B-axis demodulator 70, respectively. Thus part of the output from the receive coil 50 is transmitted to both demodulators.

The demodulators 60 and 70 are preferably synchronous demodulators, well known and understood in the art, although asynchronous demodulators may also be used.

From the A-axis demodulator 60, a conductor 62 extends to a variable scale factor 64. The purpose of the variable scale factor is to vary the relationship between A and B in absolute values, as discussed above in conjunction with FIGS. 4, 5, and 6. That is, in the apparatus 30, the absolute value of A is varied by the variable scale factor 64, while the absolute value of B is not varied. The variable scale factor 64 may accomplish scaling in several different ways, such as changing the gain of an amplifier, resistive attenuation, etc. The particular type of scaling is relatively unimportant, so long as the proper scale factors are achieved.

In practice, the variable phase shift circuitry 40 and the variable scale factor circuitry 64 are preferably ganged together. Adjustment of the variable scale factor also adjusts the variable phase shift to keep them lined up.

From the variable scale factor 64, a conductor 66 extends to an absolute value reference block 68. It is preferable that the scale factoring be accomplished prior to the absolute value function. The absolute value circuitry 68 preferably includes active gain elements to minimize different types of errors which may occur, such as offset and zero crossover errors. As is well known and understood, various types of existing circuits may be usable for providing the absolute value function.

From absolute value circuitry 68, a conductor 78 extends to a comparator 80. The comparator 80 includes comparator and amplifier functions which may be of a differential type, summing type, or various other types of configurations. The comparator 80 preferably is configured to yield a smooth, continuous response as its output changes from one polarity to the other.

From the B-axis demodulator 70, a conductor 72 extends to a second absolute value circuitry 74. The absolute value 74 is preferably substantially identical to the absolute value circuitry 68. A conductor 76 then extends from the absolute value circuitry 74 to the comparator 80.

The variable scale factor 64 is in the A-axis demodulator circuitry, but it could well be included in the B-axis demodulator circuitry, if desired. In the alternative, scaling could be accomplished in both axes if desired. For example, in addition to the variable scale factor 64, extending between conductors 62 and 66, a second variable scale factor, not shown, could be inserted in conductor 72 between the B-axis demodulator 70 and the absolute value circuitry 74. Moreover, if desired, the variable scaling could be accomplished between the absolute value circuitry and the comparator.

From the comparator 80, a conductor 82 extends to indicator means 84. The indicator means may be of any contemporary type, such as a meter, an audio output, etc.

The comparator 80 considers only magnitude, and not polarity, from its input signals, and the magnitude only is thus used as a basis for its output on conductor 82 to the indicator means 84. The absolute value circuitry elements 68 and 74 for the A-axis and B-axis, respectively, provide the inputs to the comparator on conductors 78 and 76, respectively. Since magnitude alone is considered as a basis for the indicator means 84, differences in filters, coupling circuits, or feedback delays cause only apparent scale factor errors. These errors may be adjusted by the operator of the apparatus by altering the sample axes slightly to compensate for the scale factor error. An adjustment of the sample axis is part of the initial procedure by the operator in setting up the apparatus, and is known and understood.

In FIGS. 4, 5, and 6, in accordance with the discussion pertaining thereto, the variable scale factor 64 is implemented along the A-axis, as is shown in FIG. 7. As has been discussed above, the variable scale factor could be in the B-axis, if desired, or in both the A and B axes to provide greater flexibility with respect to discriminating between various types of metallic targets, and at the same time eliminating the effects of mineralized soil.

The algebraic relationship between the A-axis signal and the B-axis signal is predetermined by the variable scale circuitry 64, and may be varied, as discussed above in conjunction with FIGS. 4, 5, and 6. For discriminating between different types of metals, the algebraic relationship, or the equation defining the algebraic relationship between the A and B axes, may be varied, to selectively provide a response to the desired metal. The algebraic relationship may be greater than unity or less than unity in order to provide the desired response. As indicated, the algebraic relationship is in terms of magnitude or absolute value, with polarity being immaterial.

There are two variables in the apparatus of the present invention, the first variable being the rotation of the sampling axis accomplished by the variable phase shift element 40, and the second variable being the variable scale factor circuitry 64. By predetermining the variable phase shift, or the location of the A and B sampling axes, and the algebraic relationship between the absolute values of the signal sampled at the two axes, the apparatus of the present invention provides for the elimination of mineral ground effects and for the discrimination of various types of metals. As has been discussed, the discrimination may be broad enough to include several types of metals, or it may be narrowed to provide an output response to only a single type of metal.

The individual blocks included in FIG. 7 represent various circuit elements or components, each of which is relatively well known and understood. Moreover, the apparatus 30 as embodied in FIG. 7 represents only the minimum required for the apparatus to function. Other elements may be added without detracting from the basic theory of operation as set out herein. For example, variable feedback could be added by feeding the output of the demodulators back to the input of their input. The inputs of the absolute value elements could be capacitively coupled, or bandpass filters could be inserted in place of capacitors. Filters have the advantage of cut-off speed over capacitors. Persons skilled in the art understand the use of feedback, filters, capacitors, etc.

The alternatives discussed in the preceding paragraph are all well known ways of eliminating the mineral signal and of discriminating at the same time. All of them have a flyback signal. The apparatus of the present invention utilizes the flyback signal and simplifies the components or elements involved, and at the same time reduces the cost of the apparatus.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Controlled phase responsive metal detector apparatus, comprising, in combination:
    a transmit coil for providing a magnetic field output signal at a desired frequency;
    oscillator means for providing the desired frequency for the transmit coil output signal;
    a receive coil for receiving signals indicative of the presence of mineralized soil and metals in response to the output signal of the transmit coil;
    sampling means for sampling the signals received by the receive coil at predetermined phase relationships with respect to the output signal, including
        a first demodulator for sampling the signals at a first predetermined phase relationship and for providing a first output signal responsive thereto, and
        a second demodulator for sampling the signals at a second predetermined phase relationship and for providing a second output signal responsive thereto;
    variable scale factor means for providing a desired algebraic relationship between the output signals from the first and second demodulators;
    means for determining the absolute value of the output signals from the first and second demodulators;
    means for comparing the absolute values of the output signals from the first and second demodulators and their algebraic relationship; and
    means for providing a third output signal in response to the compared absolute values when the values are within the desired algebraic relationship to discriminate among metals detected.

2. The apparatus of claim 1 in which the sampling means for sampling the signals further includes a first sampling axis and a second sampling axis, and the signal sampled at the first sampling axis is transmitted to the first demodulator and the signal sampled at the second sampling axis is transmitted to the second demodulator.

3. The apparatus of claim 2 in which the sampling means further includes means for rotating the sampling axes to selectively discriminate among different metals detected and to substantially eliminate mineral ground effects.

4. The apparatus of claim 3 in which the means for rotating the sampling axes and the variable scale factor means are ganged together for jointly rotating the sampling axes and selecting a desired algebraic relationship between the first and second demodulator outputs.

5. The apparatus of claims 1 or 3 in which the oscillator means operates in the very low frequency range of the radio frequency spectrum.

6. A method of detecting metal, comprising the steps of
providing a transmit coil;
providing an oscillating output signal;
coupling the oscillating output signal to the transmit coil;
providing a receive coil for receiving signals in response to the output signal;
selecting a first sampling axis and a second sampling axis at predetermined phase relationships with respect to the output signal;
sampling the received signals at the first and second sampling axes;
selecting an algebraic relationship between the signals sampled at the first and second sampling axes to discriminate among metals detected;
comparing the absolute values of the sampled signals in accordance with the selected algebraic relationship; and
providing an output in response to the algebraic relationship of the compared absolute values indicative of the desired metals detected.

7. The method of claim 6 in which the step of selecting a first sampling axis and a second sampling axis includes the step of determining the maximum received signal responsive to mineralized soil.

8. The method of claim 7 in which the step of selecting a first sampling axis and a second sampling axis includes a further step of rotating the sampling axes with respect to the maximum received mineralized soil signal.

* * * * *